United States Patent [19]
Muramatsu et al.

[11] Patent Number: 5,990,230
[45] Date of Patent: *Nov. 23, 1999

[54] FINELY PARTICULATE POLYMER FOR STENCIL INK

[75] Inventors: Ichiro Muramatsu; Mitsuo Kase, both of Chiba; Toshiaki Kano; Hiroshi Matsuda, both of Tokyo, all of Japan

[73] Assignees: Dainippon Ink and Chemicals Inc.; Riso Kagaku Corporation, both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,286

[22] Filed: May 17, 1996

[30] Foreign Application Priority Data

May 22, 1995 [JP] Japan .................................. 7-122398

[51] Int. Cl.$^6$ ................ C08J 3/00; C08K 3/20; C08L 75/00; C09D 11/12
[52] U.S. Cl. .................. 524/590; 106/31.01; 106/31.13; 106/31.6; 106/31.27; 428/402; 428/407; 523/160; 523/161; 523/200; 523/220; 524/507; 524/589; 524/591
[58] Field of Search ..................... 524/589, 590, 524/507, 591; 428/402, 407; 523/161, 200, 220, 160; 106/20 R, 22 C, 31.01, 31.13, 31.6, 31.27

[56] References Cited

U.S. PATENT DOCUMENTS

| | | |
|---|---|---|
| 4,162,997 | 7/1979 | Walsh . |
| 4,243,702 | 1/1981 | Walsh . |
| 5,155,165 | 10/1992 | Maruyama e tal. ..................... 524/839 |
| 5,312,865 | 5/1994 | Hoefer et al. ........................... 524/591 |

FOREIGN PATENT DOCUMENTS

| | | |
|---|---|---|
| 0 018 099 | 10/1980 | European Pat. Off. . |
| 0 255 078 | 2/1988 | European Pat. Off. . |
| 4-85376 | 3/1992 | Japan . |
| 6-279561 | 10/1994 | Japan . |
| 7-324117 | 12/1995 | Japan . |

*Primary Examiner*—Patrick D. Niland
*Attorney, Agent, or Firm*—Armstrong, Westerman, Hattori, McLeland & Naughton

[57] ABSTRACT

A finely particulate polymer for use in a stencil ink is disclosed which is uniformly dispersible into a binder polymer having a solubility parameter of 11.0 or lower and has an average particle diameter of from 0.1 to 10 $\mu$m and a maximum particle diameter of 50 $\mu$m or smaller. The finely particulate polymer is highly advantageous in that stencil inks having an appropriate viscosity can be easily obtained with the particulate polymer using the same formulation even when the inks contain different colorants, and that with the particulate polymer, a colorant which has been unusable due to its adverse influence on the storage stability of stencil inks can be used to produce a stencil ink having excellent storage stability by encapsulating the colorant in the individual polymer particles.

10 Claims, No Drawings

FINELY PARTICULATE POLYMER FOR STENCIL INK

FIELD OF THE INVENTION

The present invention relates to a finely particulate polymer for use in a stencil ink.

BACKGROUND OF THE INVENTION

Stencil printing is a printing process which can be easily carried out and has been extensively used from old times. As a result of the automation of stencil preparation and printing operation in stencil printing in recent years, this printing process has become more convenient and has come to be widely used in new applications. For this stencil printing, W/O emulsion inks have been mostly used from the standpoints of printability and machine operation. Such inks are usually produced by kneading a colorant (coloring material) together with a resin and adding water thereto.

However, formulations should be varied according to colorants in order to impart satisfactory storage stability to the inks, and much labor has been required for making particular formulations suitable for obtaining satisfactory inks. Since the storage stability of emulsion inks varies considerably depending on the chemical properties of individual colorants, colorant suitability should be carefully tested when selecting a colorant. In addition, the kinds of usable colorants have been limited accordingly.

Furthermore, there are cases where some kinds of colorants are unable to give inks having satisfactory storage stability even when formulations are changed. Another drawback of conventional emulsion inks is that according to the degree of kneading of the emulsion ink during continuous printing, the amount of colorant components which dissolve into the aqueous phase or oil phase changes or the interaction between the colorant and components of the oil phase of the emulsion ink changes, and this results in fluctuations in the viscosity of the emulsion ink.

SUMMARY OF THE INVENTION

Accordingly, an object of the present invention is to provide a finely particulate polymer for use in stencil inks which is advantageous in that stencil inks having an appropriate viscosity can be easily obtained with the particulate polymer using the same formulation even when the inks contain different colorants, and that with the particulate polymer, a colorant which has been unusable due to its adverse influence on the storage stability of stencil inks can be used to produce a stencil ink having excellent storage stability by encapsulating the colorant in the individual polymer particles.

As a result of intensive studies made by the present inventors in order to accomplish the above object, it has been found that by using a specific finely particulate polymer, inks containing different colorants can be produced using the same formulation and the inks produced have excellent storage stability. The present invention has been completed based on this finding.

The present invention provides a finely particulate polymer for use in a stencil ink, which is uniformly dispersible into a binder polymer having a solubility parameter of 11.0 or lower and has an average particle diameter of from 0.1 to 10 μm and a maximum particle diameter of 50 μm or smaller.

Preferably, the finely particulate polymer for use in a stencil ink according to the present invention is constituted of a polymer component having a solubility parameter of 11.0 or lower. More preferably, the finely particulate polymer for use in a stencil ink according to the present invention has a particle size distribution which, when applied to the Weibull probability distribution, has a value of m of 1.3 or larger.

Further, the present invention preferably includes a finely particulate polymer for use in a stencil ink which polymer is constituted of a crosslinked polymer component. The invention also preferably includes a finely particulate polymer for use in a stencil ink which polymer contains a colorant encapsulated in the particles.

The present invention further preferably provides a finely particulate polymer for use in a stencil ink which polymer is constituted of a polymer component comprising a polyurethane resin or a polyurethane-polyurea resin.

DETAILED DESCRIPTION OF THE INVENTION

Any known binder polymer ordinarily used for stencil inks can be used in combination with the finely particulate polymer of the present invention. Particularly representative examples thereof include alkyd resins, rosin-modified alkyd resins, rosin-modified phenolic resins, rosin ester resins, petroleum resins, fat compounds, modified fat compounds, gilsonite, polybutadiene, hydrogenated polybutadiene, acrylic resins, melamine resins, urea resins, phenolic resins, polyester resins, polyamide resins, urethane resins, silicone resins, epoxy resins, and cellulosic resins, all these polymers having a solubility parameter of 11.0 or lower.

Solubility parameter is a measure of solubility or compatibility, and there are several measurement methods and calculation methods for determining values of solubility parameter. Such methods are described in detail in, e.g., (i) Shin Kōbunshi Bunko 7, Toryō-yōGōsei Jushi Nyūmon (New Polymer Library 7, Introduction to Synthetic Resins for Coating), pp. 23–31 (published by K.K. Kōbunshi Kank ō-kai, 1974), (ii) TosōGijutsu (Coating Technology), June 1990, pp. 161–168, and (iii) Purasuchikku No Kōtingu Gijutsu Sōran (Comprehensive Bibliography of Plastic Coating Technology), pp. 97–138 (published by K.K. Sangyo Gijutsu Service Center, 1989). In the present invention, the solubility parameter of a polymer is calculated from the chemical structure of the starting material for the polymer using the following Small's equation (I):

Small's equation $$\delta = s\Sigma F/M \tag{I}$$

(wherein s represents the density, F represents the cohesive energy constant, and M represents the fundamental molecular weight).

In the above method, specific atoms and specific groups of atoms (functional groups) are given respective values of cohesive energy because cohesive energy has additivity, and δ is determined from the total of these cohesive energy values and from the density and molecular weight. This method is useful in determining the solubility parameters of polymers and similar substances, as in the present invention. Although several proposals have been made on cohesive energy constants, the values shown in Table 1 are employed herein.

TABLE 1
| Functional group | F | Functional group | F | Functional group | F |
|---|---|---|---|---|---|
| —CH$_3$ | 198 | 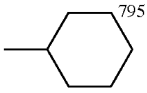 cyclohexyl | 795 | —O— | 123 |
| —CH2— | 139 | 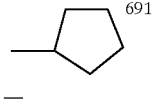 cyclopentyl | 691 | —COO— | 350 |
| —CH— | 56 | 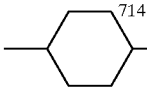 1,4-dimethylcyclohexyl | 714 | —NH$_2$ | 285 |
| —C— | −35 | 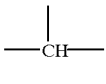 1,2-dimethylcyclohexyl | 644 | —NH— | 170 |
| —CH=CH2 | 300 | 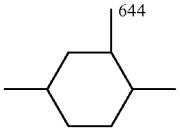 cyclohexenyl | 795 | —N— | 54 |
| —CH=CH— | 258 | 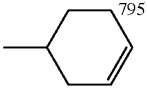 | 705 |  —C(=O)—NH2 | 603 |
| —C=CH2 | 250 | 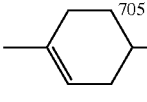 | 620 | 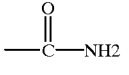 —C(=O)—NH— | 488 |
| —C≡CH | 322 | 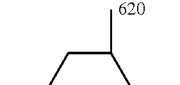 naphthyl | 1146 | —OH (phenolic) | 296 |
| —C≡C— | 222 | —OH (alcohol) | 426 | —C≡N | 435 |
|  phenyl | 750 | —CH2OH | 565 | —Cl (aliphatic) | 280 |
| 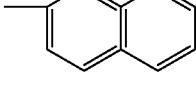 | 685 | 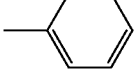 —CH(OH)— | 490 | —Cl (aromatic) | 216 |
F: cohesive energy constant (cal/ml)$^{1/2}$/mol TABLE 1-continued

| Functional group | F | Functional group | F | Functional group | F: cohesive energy constant $(cal/ml)^{1/2}/mol$ F |
|---|---|---|---|---|---|
| [meta-disubstituted benzene] | 691 | $-\underset{\underset{OH}{\mid}}{\overset{\mid}{C}}-$ | 385 | —CH2Cl | 410 |
| [para-disubstituted benzene] | 690 | —COOH | 570 | —CHCl$_2$ | 530 |
| [ortho-disubstituted benzene] | 632 | [cyclic anhydride -C(=O)-O-C(=O)-] | 622 | —NO$_2$ (aliphatic) | 460 |
| [1,3,5-trisubstituted benzene] | 630 | —CHO | 354 | —NO$_2$ (aromatic) | 345 |
| [1,2,4-trisubstituted benzene] | 632 | $\overset{\diagdown}{\underset{\diagup}{C}}=O$ | 318 | —N=C=O | 375 |
| [triazine ring] | 733 | | | conjugation | 25 |

The finely particulate polymer of the present invention is made up of fine particles comprising a polymer as an essential component. An expedient for accomplishing the object of the present invention may be to enclose a colorant with a polymer, i.e., to use fine polymer particles containing a colorant, to thereby enable the production of stencil inks even with different colorants. However, not all kinds of finely particulate polymers are applicable to a stencil ink.

This is because the binders and solvents contained in the stencil inks should be lowly polar from the standpoint of printability and, hence, use of a finely particulate polymer having high polarity poses problems concerning dispersibility. If a highly polar, finely particulate polymer is incorporated into a stencil ink, the polymer particles aggregate in the ink and, in an extreme case, the ink gels.

Furthermore, a finely particulate polymer for stencil ink use is required to have an appropriate particle diameter because the ink, when used in printing, is passed through fine openings of a stencil. To satisfy these requirements, the finely particulate polymer of the present invention has the appropriate particle size described later and preferably is constituted of a polymer component having a solubility parameter of 11.0 or lower. Because of its low polarity, the finely particulate polymer is uniformly dispersible into a lowly polar binder for use in a stencil ink and is hence best suitable for the binder.

The uniform dispersibility of a finely particulate polymer is herein ascertained through an examination of a dispersion of the finely particulate polymer in a binder resin with the naked eye or with an optical or electron microscope. The polymer component of the finely particulate polymer of the present invention can comprise any known polymer having a solubility parameter of 11.0 or lower.

Particularly representative examples of the polymer component include polymerization resins such as polyethylene, polypropylene, polystyrene, PVC, polybutadiene, and acrylics, condensation resins such as melamine, urea, phenolic, polyester, alkyd, and polyamide resins, and other resins including urethane resins, silicone resins, epoxy resins, cellulosic resins, rosin resins, petroleum resins, gilsonite, and copolymers of these.

Especially preferred of those resins are urethane resins because the resin composition of fine urethane resin particles can be freely designed. Fine urethane resin particles in the present invention mean fine particles of a polymer containing a urethane component. The urethane component comprises a polyisocyanate compound as an essential ingredient. The urethane component may optionally be a mixture with or a product of reaction with a polyhydroxy compound which has a functional group reactive with an isocyanate group and/or a polyamine compound, etc.

The fine urethane particles may be obtained by dispersing an organic phase comprising a polyisocyanate compound optionally mixed with a polyhydroxy compound into water and curing the dispersed phase by heating the dispersion without adding any substance. Alternatively, the fine urethane particles may be obtained by the interfacial polymerization method in which a polyamine or another compound is added to the dispersion.

Any known polyisocyanate compound can be used in the above methods. Particularly representative examples thereof are as follows. Representative examples of monomeric aliphatic isocyanates include hexamethylene diisocyanate, 2,4-diisocyanate-1-methylcyclohexane, diisocyanatecyclobutane, tetramethylene diisocyanate, o-, m-, or p-xylylene diisocyanate, hydrogenated xylylene diisocyanate, dicyclohexylmethane diisocyanate, dimethyldicyclohexylmethane diisocyanate, lysine diisocyanate, cyclohexane diisocyanate, dodecane diisocyanate, tetramethylxylene diisocyanate, and isophorone diisocyanate.

Representative examples of monomeric aromatic isocyanates include tolylene 2,4-diisocyanate, tolylene 2,6-diisocyanate, diphenylmethane 4,4'-diisocyanate, 3-methyldiphenylmethane 4,4'-diisocyanate, m- or p-phenylene diisocyanate, chlorophenylene 2,4-diisocyanate, naphthalene 1,5-diisocyanate, diphenyl 4,4'-diisocyanate, 3,3'-dimethyldiphenyl diisocyanate, 1,3,5-triisopropylbenzene 2,4-diisocyanate carbodiimide-modified diphenylmethane diisocyanate, polyphenyl polymethylene isocyanate, and diphenyl ether diisocyanate.

Representative examples of modified polyisocyanates derived from those various isocyanate monomers include polyurethane polyisocyanates obtained by reacting an excess of one or more isocyanate monomers with a polyhydroxy compound represented by various di-, tri-, and tetrahydric and higher alcohols; polyisocyanates containing an isocyanurate ring which are obtained by polymerizing various isocyanate monomers such as those enumerated above; and polyisocyanates containing a buret bond which are obtained by reaction with water. Especially preferably used in the present invention from the standpoint of weatherability are fine particles of a non-yellowing urethane resin obtained using a polyisocyanate comprising an aliphatic polyisocyanate such as the aforementioned ones in an amount of at least 10%, preferably at least 20%. The number-average molecular weight of the polyisocyanate is desirably from 200 to 10,000, preferably from 300 to 7,000.

On the other hand, the polyhydroxy compound which is mixed if desired not only serves to compensate for the insufficient internal crosslinking resulting from the formation of polymer particle walls, but also has the effect of further improving the mechanical strength of the polymer particles. Any known polyhydroxy compound can be used. Particularly representative examples thereof belong to any of the following groups.

(a) Polyhydric alcohols such as ethylene glycol, propylene glycol, 1,3-propanediol, 1,4-butanediol, 1,3-butanediol, 1,5-pentanediol, neopentyl glycol, 1,6-hexanediol, 1,4-bis(hydroxymethyl)cyclohexane, bisphenol A, hydrogenated bisphenol A, hydroxypivalyl hydroxypivalate, trimethylolethane, trimethylolpropane, 2,2,4-trimethyl-1,3-pentanediol, glycerol, and hexanetriol;

(b) Various polyether glycols such as polyoxyethylene glycol, polyoxypropylene glycol, polyoxyethylene polyoxytetramethylene glycol, polyoxypropylene polyoxytetramethylene glycol, and polyoxyethylene polyoxypropylene polyoxytetramethylene glycol;

(c) Modified polyether polyols obtained by the ring-opening polymerization of any of various polyhydric alcohols such as the aforementioned ones with any of various (cyclic) ether-bond-containing compounds such as ethylene oxide, propylene oxide, tetrahydrofuran, ethyl glycidyl ether, propyl glycidyl ether, butyl glycidyl ether, phenyl glycidyl ether, and allyl glycidyl ether;

(d) Polyester polyols obtained by the co-condensation of at least one of various polyhydric alcohols such as the aforementioned ones with a polycarboxylic acid represented particularly by succinic acid, adipic acid, sebacic acid, azelaic acid, phthalic acid, tetrahydrophthalic acid, hexahydrophthalic acid, maleic acid, fumaric acid, citraconic acid, itaconic acid, glutaconic acid, 1,2,5-hexanetricarboxylic acid, 1,4-cyclohexanedicarboxylic acid, 1,2,4-benzenetricarboxylic acid, 1,2,5-benzenetricarboxylic acid, 1,2,4-cyclohexanetricarboxylic acid, 2,5,7-naphthalenetricarboxylic acid, and the like;

(e) Lactone-based polyester polyols obtained by the polycondensation reaction of at least one of various polyhydric alcohols such as the aforementioned ones with any of various lactones such as caprolactone, δ-valerolactone, and 3-methyl-δ-valerolactone; or lactone-modified polyester polyols obtained by the polycondensation reaction of any of various polyhydric alcohols such as the aforementioned ones with any of various polycarboxylic acids such as the aforementioned ones and any of various lactones such as the aforementioned ones;

(f) Epoxy-modified polyester polyols obtained by synthesizing polyester polyols in the presence of at least one of various epoxy compounds such as bisphenol A epoxy compounds, hydrogenated bisphenol A epoxy compounds, glycidyl ethers of mono- and/or polyhydric alcohols, and glycidyl esters of mono- and/or polybasic acids; and (g) Polyester polyamide polyols, polycarbonate polyols, polybutadiene polyols, polypentadiene polyols, alkyd polyols, hydroxylated rosin-modified resins, castor oil, castor oil derivatives, hydrogenated castor oil, hydrogenated castor oil derivatives, hydroxylated acrylic copolymers, hydroxylated fluorine compounds, and hydroxylated silicone resins.

The polyhydroxy compounds enumerated under (a) to (g) above may, of course, be used either alone or in combination of two or more thereof. These polyhydroxy compounds desirably have a number-average molecular weight of from 200 to 10,000, preferably from 300 to 7,000, from the standpoint of attaining sufficient crosslinking within individual fine polymer particles.

Especially preferred of those polyhydroxy compounds are alkyd polyols because they can be easily designed to have low polarity. The alkyd polyols are hydroxylated polyester resins which are obtained by the condensation reaction of a mixture comprising a fat or fatty acid, a carboxylic acid, and a polyol monomer as essential ingredients, and which have a hydroxyl value of from 5 to 500, preferably from 10 to 400, a number-average molecular weight of from 200 to 50,000, preferably from 400 to 30,000, and an oil length of from 5 to 95, preferably from 10 to 90.

The fat herein means a fatty acid triglyceride. Representative examples thereof include linseed oil, perilla oil, tung oil, tall oil, coconut oil, soybean oil, castor oil, safflower oil, hempseed oil, oiticica oil, rapeseed oil, bran oil, cotton seed oil, palm oil, palm kernel oil, sardine oil, and cuttlefish lever oil.

The fatty acid is an aliphatic monocarboxylic acid in which the aliphatic moiety is an alkyl, alkenyl, or alkynyl. Representative examples thereof include fatty acids obtained from the fats enumerated above, tall oil fatty acid, castor oil fatty acid, dehydrated-castor-oil fatty acid, "Cardura E" (glycidyl ester of a Versatic acid, manufactured by Shell, the Netherlands), and octylic acid.

The fine urethane particles of the present invention are especially preferably constituted of a resin containing any of these fats and fatty acids as an essential component.

Examples of the carboxylic acid include aliphatic carboxylic acids such as succinic acid, adipic acid, azelaic acid, sebacic acid, HET anhydride, Himic anhydride, malic acid (anhydride), fumaric acid, itaconic acid, citraconic acid, glutaconic acid, and 1,2,5-hexanetricarboxylic acid; alicyclic and aromatic carboxylic acids such as 1,1-cyclohexanedicarboxylic acid, hexahydrophthalic acid, 1,3-cyclohexanedicarboxylic acid, 1,4-cyclohexanedicarboxylic acid, methylhexahydrophthalic acid, 4-t-butylcyclohexanemonocarboxylic acid, hexahydrobenzoic acid, phthalic acid (anhydride), isophthalic acid, terephthalic acid, tetrachlorophthalic anhydride, tetrahydrophthalic anhydride, hexahydrophthalic acid, benzoic acid, p-t-butylbenzoic acid, p-methylbenzoic acid, trimellitic anhydride, pyromellitic anhydride, 1,4-cyclohexanedicarboxylic acid, 1,2,4-benzenetricarboxylic acid, 1,2,5-benzenetricarboxylic acid, 1,2,4-cyclohexanetricarboxylic acid, and 2,5,7-naphthalenetricarboxylic acid; methyl and other esters of these acids; and methylcyclohexenetricarboxylic anhydride.

The polyol monomer is a monomer having two or more hydroxyl groups per molecule. This polyol monomer is not particularly limited. Particularly representative examples thereof include ethylene glycol, propylene glycol, propanediol, butylene glycol, pentanediol, hexanediol, methylpentanediol, neopentyl glycol, triethylene glycol, cyclohexanedimethanol, hydrogenated bisphenol A, 1,4-bis(hydroxymethyl)cyclohexane, 2,2,4-trimethyl-1,3-pentanediol, hydroxypivalyl hydroxypivalate, glycerol, trimethylolethane, trimethylolpropane, hexanetriol, pentaerythritol, and polymers, such as dimers, of these. The alkyd polyols are produced from the various starting materials enumerated above by the ordinarily used known melt or solvent method.

In the case where a polyhydroxy compound is used in the present invention, a polyisocyanate compound is mixed with the polyhydroxy compound in such a proportion that the equivalent ratio of the isocyanate groups contained in the polyisocyanate compound to the hydroxyl groups contained in the polyhydroxy compound is from 1:0.05 to 1:2.0, preferably from 1:0.1 to 1:1.8.

Examples of the polyamine compound for use in the present invention include ordinarily used known diamines and polyamines and mixtures thereof. Particularly representative examples thereof include 1,2-ethylenediamine, 1,3-propanediamine, bis(3-aminopropyl)amine, hydrazine, hydrazine-2-ethanol, bis(2-methylaminoethyl)methylamine, 1,4-diaminocyclohexane, 3-amino-1-methylaminopropane, N-hydroxyethylethylenediamine, N-methylbis(3-aminopropyl)amine, tetraethylenediamine, hexamethylenediamine, bis(N,N'-aminoethyl)-1,2-ethylenediamine, 1-aminoethyl-1,2-ethylenediamine, diethylenetriamine, tetraethylenepentamine, pentaethylenehexamine, phenylenediamine, toluylenediamine, 2,4,6-triaminotoluene trihydrochloride, 1,3,6-triaminonaphthalene, isophoronediamine, xylylenediamine, hydrogenated xylylenediamine, 4,4'-diaminodiphenylmethane, hydrogenated 4,4'-diaminodiphenylmethane, tolylenediamine, phenylenediamine, polyoxyalkylenepolyamines, and various derivatives of these polyamine monomers.

The particle shape of the finely particulate polymer is preferably spherical from the standpoint of dispersibility into an ink binder. Spherical polymer particles can be easily obtained usually by polymerization in a dispersion medium.

Water or an organic solvent can be used as the dispersion medium. Polymerization in the former is generally called emulsion polymerization or suspension polymerization, while polymerization in the latter is generally called dispersion polymerization.

In the case of using an organic solvent as a dispersion medium, the organic solvent selected should be one in which the polymer component constituting the finely particulate polymer does not dissolve. Examples of such organic solvents include aliphatic hydrocarbons, which are generally nonpolar solvents. In the case of using water as a dispersion medium, the resin component may be diluted beforehand with an organic solvent for the purpose of regulating the viscosity of the resin component. Examples of organic solvents suitable for use as the diluent include aromatic or aliphatic hydrocarbons, esters, ethers, alcohols, and ketones.

It is, however, desirable to use water as a dispersion medium from the standpoints of cost, equipment, safety, etc. For stabilizing the dispersion of a urethane component into a dispersion medium, one or more dispersion stabilizers may be used which are selected from poly(vinyl alcohol), hydroxyalkyl celluloses, carboxyalkyl celluloses, gum arabic, polyacrylates, polyacrylamide, polyvinylpyrrolidone, ethylene-maleic anhydride copolymers, various known ordinarily used nonionic, anionic, or cationic surfactants, and protective colloids.

For dispersion into a dispersion medium, a dispersing machine is used such as, e.g., a general-purpose fluid agitator, a high-speed high-shear agitator, a colloid mill, an ultrasonic emulsifier, a high-pressure homogenizer called a pressure type nozzle emulsifier, a bubble homogenizer, a microfluidizer, or a nanomizer.

The average particle diameter of the finely particulate polymer of the present invention is determined from spheres as the basic shape. Since the particulate polymer is made up of many particles having various particle diameters, the particulate constitution should be expressed by means of both average particle diameter and particle size distribution. Although average particle diameters generally include number-average, length-average, area-average, and volume-average particle diameters, the term "average particle diameter" used in the present invention means the volume-average particle diameter ordinarily used.

The finely particulate polymer of the present invention has an average particle diameter of from 0.1 to 10 $\mu$m, preferably of from 0.1 to 5 $\mu$m and a maximum particle diameter of 50 $\mu$m or smaller, preferably of 30 $\mu$m or smaller. If an ink containing coarser polymer particles is used in printing, the stencil is clogged with polymer particles, making it impossible to obtain a satisfactory image. The finely particulate polymer preferably has a narrow, or sharp, particle size distribution.

As an index to the sharpness of the particle size distribution, the shape parameter m in the Weibull distribution represented by the following equation is used herein:

$f(t)=d/dt \cdot F(t)=m/\eta(t/\eta)^{m-1} \exp[-(t/\eta)^m]$ (wherein F(t) represents the Weibull distribution, f(t) represents the probability density function for the Weibull distribution, t represents the particle diameter, η represents the scale parameter, and m represents the shape parameter).

The shape parameter m indicates the shape of the distribution. The larger the value of m, the narrower the distribution. Since not all of particle size distributions cannot be completely expressed with the probability density function for Weibull distribution, the most approximate value is used. The finely particulate polymer of the present invention desirably has a particle size distribution in which the value of the shape parameter is 1.3 or larger, preferably 1.5 or larger.

The generally employed method for coloring the finely particulate polymer of the present invention is to use a colorant, e.g., a pigment or a dye. However, in the case where durability such as weatherability is important, use of a pigment is preferred. In a stencil ink, a contact of the surface of the colorant with water exerts a considerable influence on the stability of the ink. This influence can be opposed by encapsulating the colorant in individual particles, i.e., enclosing the colorant with the resin component, whereby the stability of the stencil ink can be improved.

The pigment to be encapsulated according to the present invention may be any of the known ordinarily used organic pigments, inorganic pigments, and extender pigments and other pigments. Particularly representative examples of the organic pigments include insoluble azo pigments such as Benzidine Yellow, Hansa Yellow, and Lake Red 4R; soluble azo pigments such as Lake Red C, Carmine 6B, and Bordeaux 10; copper phthalocyanine pigments such as phthalocyanine blue and phthalocyanine green; basic lake pigments such as Rhodamine Lake and Methyl Violet Lake; acid lake pigments such as quinoline lakes and Fast Sky Blue; mordant dye pigments such as alizarin lakes; vat dye pigments such as anthraquinone pigments, thioindigo pigments, and perinone pigments; quinacridone pigments such as Cinquacia Red B; dioxazine pigments such as Dioxazine Violet; and condensed azo pigments such as Chromophthal.

Particularly representative examples of the inorganic pigments include chromates such as chrome yellow, zinc chromate, and Molybdate Orange; ferrocyano compounds such as prussian blue; metal oxides such as titanium white, zinc white, Mapico Yellow, black iron oxide, red iron oxide, and chromium oxide green; sulfides such as cadmium yellow, cadmium red, and mercury sulfide; selenides; sulfates such as barium sulfate and lead sulfate; silicates such as calcium silicate and ultramarine; carbonates such as calcium carbonate and magnesium carbonate; phosphates such as cobalt violet and manganese violet; metal powders such as an aluminum powder, gold powder, silver powder, and brass powder; and pearl pigments.

Particularly representative examples of the extender pigments include precipitated barium sulfate, barium carbonate, whitewash, gypsum, alumina white, clay, silica, silica white, talc, calcium silicate, and precipitated magnesium carbonate. Also usable as an extender pigment is carbon black, which belongs to neither inorganic pigments nor organic pigments.

A pigment may be previously dispersed and kneaded into a raw polymer during the production of a finely particulate polymer to encapsulate the pigment in the finely particulate polymer. Alternatively, the pigment may be first dispersed and kneaded into a starting material for a polymer such as monomers, oligomers, solvents, and other additives, and then the mixture may be polymerized to encapsulate the pigment in the finely particulate polymer. In the case of fine urethane particles, it is preferred to knead a pigment together with one or more polyols as a starting material to give a mill base. If desired and necessary, the surface of the pigment may be chemically treated before use or during the kneading. It is also possible, if desired, to knead a combination of two or more pigments or to use known additives ordinarily used in the field of the coating industry or printing ink industry, such as, e.g., a dispersant and an antiflooding agent, for the kneading.

The kneading is conducted using an ordinarily employed known dispersing machine such as, e.g., a ball mill, pebble mill, sand mill, attritor, roll mill, high-speed impeller disperser, or high-speed stone mill. If desired and necessary, an organic solvent inert to hydroxyl groups and isocyanate groups may be added to regulate the viscosity of the mixture being kneaded.

The mill base thus obtained is mixed with a polyisocyanate and, according to need, further with an alkyd polyol, a polyhydroxy compound, a reaction catalyst, and an organic solvent in a proportion suitable for the intended application to give a homogeneous organic phase. From this organic phase, fine polyurethane particles containing a pigment encapsulated therein can be obtained by the method described hereinabove.

The colored finely particulate polymer may be dispersed into a binder after the synthesized particles contained in the dispersion medium are dried by, e.g., the spray drying method, centrifuging drying method, filtration drying method, or fluidized-bed drying method to convert the dispersed particles into a fine powder. Alternatively, in the case where the dispersion medium is an organic solvent, the colored finely particulate polymer may be dispersed as it is into a binder. In the case where the dispersion medium is water, the colored finely particulate polymer may be dispersed into a binder after flushing.

In the dispersion operation described above, any of the pigments and extender pigments enumerated above and various additives and organic solvents can, of course, be added. For emulsification as the step of finishing a printing ink, an ordinarily employed known emulsifying machine is used, such as, e.g., a general-purpose fluid agitator, a high-speed high-shear agitator, a colloid mill, a pressure type nozzle (jet) emulsifier, an ultrasonic emulsifier, a mechanical vibration agitator, or an electrostatic agitator. Two or more such emulsifiers may be used in combination for improving the efficiency of emulsification.

An agihomomixer having a high-speed shearing homomixer at the center and a low-speed paddle mixer disposed therearound is explained in detail as an example. Although this type of mixer does not have the ability to reduce particles into crystal grains, it has a sufficient reduction power to convert a high-viscosity paste or a gel into a colloid.

In this apparatus, the agitating blades rotate at a high speed not in an open area but in a fixed ring disposed close to the periphery of the agitating blades. Since the agitating blades rotate at a high-speed (from thousands to tens of thousands RPM) within the limited region, considerable cavitations are formed. Namely, besides the shearing effect of the rotation itself, cavitation impacts are also applied. Thus, the apparatus is highly effective in reduction into fine particles.

In addition to the microscopic homogenization described above, the apparatus also has a macroscopic homogenization mechanism which causes a circulation flow throughout the tank. Consequently, this apparatus is suitable for the deagglomeration of the fine particles of the present invention and for the acceleration of emulsification. In the case where a nonionic surfactant is used to form a W/O emulsion in the present invention, any nonionic surfactant having an HLB value as calculated with the Griffin's equation of from 1 to 15 can be employed. However, nonionic surfactants having an HLB value of from 1 to 9 are preferred for forming a more stable W/O emulsion.

Representative examples of ether type nonionic surfactants include polyoxyethylene alkyl (aryl)ethers such as alcohol polyoxyethylene glycol ethers, fatty acid ester polyethylene glycol ethers, and alkylaryl polyethylene glycol ethers; polyoxyethylene polyhydric alcohol ethers such as sorbitol polyethylene glycol ether, sorbitol/fatty acid ester polyethylene glycol ethers, sorbitan polyethylene glycol ether, sorbitan/fatty acid ester polyethylene glycol ethers, mannitol polyethylene glycol ether, mannitan polyethylene glycol ether, pentaerythritol polyethylene glycol ether, and other ethers of polyhydric alcohols; polypropylene glycol polyethylene glycol ethers; and other polyethylene glycol ethers (excluding ethers of polyhydric alcohols). Representative examples of ester type nonionic surfactants include esters of polyhydric alcohols such as pentaerythritol/fatty acid esters, mannitol/fatty acid esters, mannitan/fatty acid esters, sucrose/fatty acid esters, sorbitol/fatty acid esters, sorbitol/cyclic organic acid esters, sorbitan/fatty acid esters, sorbitan/cyclic organic acid esters, glycerol/fatty acid esters, glycerol/cyclic organic acid esters, and propylene glycol/fatty acid esters; and other esters including fatty acid/polyethylene glycol esters, cyclic organic acid/polyethylene glycol esters, inorganic acid esters, and polyethylene glycol esters. Representative examples of nonionic surfactants other than ether type and ester type include fatty acid amide/polyethylene glycol adducts, alkylamine/polyethylene glycol adducts, alkylol amides, alkylol amine/polyethylene glycol adducts, and other nitrogenous derivatives thereof. Such various surfactants may be used either alone or in combination of two or more thereof.

In the present invention, the type of emulsion is not particularly limited to the water-in-oil (W/O) type. By using suitably selected surfactants having an appropriate HLB, the finely particulate polymer of the present invention is also applicable to either of an oil-in-water (O/W) type emulsion and a composite multi-phase (W/O/W or O/W/O) emulsion.

The present invention will be explained below in more detail by reference to Synthetic Examples, Examples, and Comparative Examples, but the invention should not be construed as being limited thereto. Hereinafter, all parts and percents are by weight unless otherwise indicated.

SYNTHESIS EXAMPLE 1

Into a 2-liter four-necked flask equipped with a stirrer, nitrogen feed pipe, thermometer, reflux condenser, and decanter were introduced 919 parts of coconut oil fatty acid, 49 parts of trimethylolpropane, 270 parts of pentaerythritol, and 263 parts of phthalic anhydride. The contents were then gradually heated to 240° C., and were reacted while removing water, until the resulting reaction product came to have an acid value of 5. The alkyd polyol (PO-1) thus obtained had a hydroxyl value of 50.

A mixture of 500 parts of PO-1, 500 parts of blue pigment "Fastgen Blue FGF" (a copper phthalocyanine blue pigment manufactured by Dainippon Ink & Chemicals, Inc., Japan), and 250 parts of toluene was kneaded with a three-roll mill to obtain a blue-colored polyol. This blue polyol is hereinafter referred to as PO-1B.

Subsequently, an aqueous phase was prepared in a 1,000-ml flask by dissolving 4 parts of "PVA-420K" [a partially saponified poly(vinyl alcohol) manufactured by Kuraray Co., Ltd., Japan] in 396 parts of water. In another vessel, 68 parts of Burnock DN-901S (an isocyanurate ring-containing polyisocyanate obtained from hexamethylene diisocyanate; manufactured by Dainippon Ink & Chemicals, Inc.; isocyanate group content, 23.5%; this polyisocyanate being referred to as PI-1) was mixed with 214 parts of PO-1B, and 117 parts of toluene was added thereto, giving an organic phase.

The aqueous phase was mixed with the organic phase with a stirrer. This mixture was introduced into a high-pressure homogenizer (manufactured by APV Gaulin Co.), and treated therewith at a pressure of 500 kg/cm$^2$.

The resulting dispersion was transferred to a flask, and 4 parts of a 25% aqueous solution of ethylenediamine (hereinafter referred to as EDA) was added to the dispersion with stirring with a paddle type stirrer. After being maintained at room temperature for 2 hours, the mixture was heated to 50° C., reacted at this temperature for 1 hour, and then continuously reacted at 80° C. for 2 hours. Thus, an about 25% suspension of fine blue particles as the target particles was obtained.

This suspension is referred to as FP-1B. The particles were analyzed for particle size distribution with a laser diffraction type particle size distribution analyzer, and were found to have an average particle diameter of 1.5 μm and a value of m, indicating the particle size distribution, of 1.5. The polymer component had a solubility parameter of 10.1.

SYNTHESIS EXAMPLE 2

A mixture of 500 parts of PO-1 obtained in Synthesis Example 1, 500 parts of red pigment "Symuler Brilliant Carmine 6B288E" (a red soluble azo pigment manufactured by Dainippon Ink & Chemicals, Inc.), and 250 parts of toluene was kneaded with a three-roll mill to obtain a red-colored polyol. This red polyol is referred to as PO-1R. The subsequent procedure was carried out in the same manner as in Synthesis Example 1, except that PO-1R was used in place of PO-1B. Thus, a suspension of fine red particles as the target particles was obtained. This suspension is referred to as FP-1R.

The particles were analyzed for particle size distribution with a laser diffraction type particle size distribution analyzer, and were found to have an average particle diameter of 2.1 μm and a value of m, indicating the particle size distribution, of 1.6. The polymer component had a solubility parameter of 10.1.

SYNTHESIS EXAMPLE 3

A mixture of 875 parts of soybean oil, 268 parts of trimethylolpropane, and 357 parts of phthalic anhydride was reacted in the same manner as in Synthesis Example 1 until the resulting reaction product came to have an acid value of 5. Thus, an alkyd polyol (PO-2) was obtained. This polyol had a hydroxyl value of 50.

Kneading was then conducted in the same manner as in Synthesis Example 1, except that PO-2 was used in place of PO-1. Thus, a blue-colored polyol was obtained, which is referred to as PO-2B. The subsequent procedure was carried out in the same manner as in Synthesis Example 1, except that PO-2B was used in place of PO-1B. Thus, a suspension of fine blue particles as the target particles was obtained. This suspension is referred to as FP-2B. The particles were analyzed for particle size distribution with a laser diffraction type particle size distribution analyzer, and were found to have an average particle diameter of 2.5 μm and a value of m, indicating the particle size distribution, of 1.6. The polymer component had a solubility parameter of 10.0.

SYNTHESIS EXAMPLE 4

Kneading was conducted in the same manner as in Synthesis Example 2, except that PO-2 was used in place of P-1. Thus, a red-colored polyol was obtained, which is referred to as PO-2R. The subsequent procedure was carried out in the same manner as in Synthesis Example 2, except that PO-2R was used in place of PO-1R. Thus, a suspension of fine red particles as the target particles was obtained. This suspension is referred to as FP-2R. The particles were analyzed for particle size distribution with a laser diffraction type particle size distribution analyzer, and were found to have an average particle diameter of 2.2 μm and a value of m, indicating the particle size distribution, of 1.5. The polymer component had a solubility parameter of 10.0.

SYNTHESIS EXAMPLE 5

Kneading was conducted in the same manner as in Synthesis Example 1, except that castor oil was used in place of PO-1. Thus, a blue-colored polyol was obtained, which is referred to as PO-3B. The subsequent procedure was carried out in the same manner as in Synthesis Example 1, except that the amount of PI-1 was changed to 94 parts, that PO-1B was replaced with 179 parts of PO-3B, and that the amounts of toluene and 25% aqueous EDA solution were changed to 124 parts and 12 parts, respectively. Thus, a suspension of fine blue particles as the target particles was obtained.

This suspension is referred to as FP-3B. The particles were analyzed for particle size distribution with a laser diffraction type particle size distribution analyzer, and were found to have an average particle diameter of 1.9 μm and a value of m, indicating the particle size distribution, of 1.7. The polymer component had a solubility parameter of 9.0.

SYNTHESIS EXAMPLE 6

Kneading was conducted in the same manner as in Synthesis Example 2, except that castor oil was used in place of PO-1. Thus, a red-colored polyol was obtained, which is referred to as PO-3R. The subsequent procedure was carried out in the same manner as in Synthesis Example 2, except that PO-3R was used in place of PO-1R. Thus, a suspension of fine red particles as the target particles was obtained. This suspension is referred to as FP-3R.

The particles were analyzed for particle size distribution with a laser diffraction type particle size distribution analyzer, and were found to have an average particle diameter of 2.0 μm and a value of m, indicating the particle size distribution, of 1.5. The polymer component had a solubility parameter of 9.0.

SYNTHESIS EXAMPLE 7

A mixture of 336 parts of coconut oil, 484 parts of coconut oil fatty acid, 294 parts of pentaerythritol, and 387 parts of phthalic anhydride was reacted in the same manner as in Synthesis Example 1 until the resulting reaction product came to have an acid value of 5. Thus, an alkyd resin (AL-1) for use as a stencil ink binder was obtained. This resin had a solubility parameter of 10.6.

COMPARATIVE SYNTHESIS EXAMPLE 1

A mixture of 469 parts of ethylene glycol and 1,031 parts of adipic acid was reacted in the same manner as in Synthesis Example 1 until the resulting reaction product came to have an acid value of 5. The polyester polyol (PO-4) thus obtained had a hydroxyl value of 50. Kneading was then conducted in the same manner as in Synthesis Example 1, except that PO-4 was used in place of PO-1. Thus, a blue-colored polyol was obtained, which is referred to as PO-4B.

The subsequent procedure was carried out in the same manner as in Synthesis Example 1, except that PO-4B was used in place of PO-1B. Thus, a suspension of fine blue particles as the target particles was obtained. This suspension is referred to as FP-4B. The particles were analyzed for particle size distribution with a laser diffraction type particle size distribution analyzer, and were found to have an average particle diameter of 2.4 μm and a value of m, indicating the particle size distribution, of 1.5. The polymer component had a solubility parameter of 11.1.

COMPARATIVE SYNTHESIS EXAMPLE 2

Kneading was conducted in the same manner as in Synthesis Example 2, except that PO-4 was used in place of PO-1. Thus, a red-colored polyol was obtained, which is referred to as PO-4R. The subsequent procedure was carried out in the same manner as in Synthesis Example 2, except that PO-4R was used in place of PO-1R. Thus, a suspension of fine red particles as the target particles was obtained. This suspension is referred to as FP-4R. The particles were analyzed for particle size distribution with a laser diffraction type particle size distribution analyzer, and were found to have an average particle diameter of 2.6 μm and a value of m, indicating the particle size distribution, of 1.5. The polymer component had a solubility parameter of 11.1.

INK PREPARATION EXAMPLE 1

Into a 1-liter beaker was introduced a solution of 42 parts of alkyd resin AL-1 in 30 parts of solvent No. 4 (manufactured by Nippon Oil Co., Ltd., Japan; boiling point, 235–266° C.; aniline point, 65° C.). The solution was heated to about 100° C. with stirring with an anchor blade, and 112 parts of a suspension of fine blue particles (FP-1B) was added dropwise thereto over a period of about 2 hours. This mixture was maintained under those conditions for 5 hours to vaporize the water. Thus, 100 parts of an alkyd resin dispersion of fine blue particles was obtained. This dispersion is referred to as M-1B.

To this dispersion was added 6 parts of Hexaglyn 5-O (manufactured by Nikko Chemicals Co., Ltd., Japan; polyglycerol/fatty acid ester; HLB=4). The mixture was sufficiently kneaded. Subsequently, 105 parts of ion-exchanged water containing 1 part of magnesium sulfate was added dropwise to the kneaded mixture with stirring over a period of about 1 hour to obtain a W/O emulsion as a stencil ink. Examination of the thus-obtained stencil ink with an optical microscope at a magnification of 1,000 diameters revealed that the fine particles had not aggregated and were uniformly dispersed in the ink. This ink is referred to as I-1B.

INK PREPARATION EXAMPLES 2 TO 6

The same procedure as in Ink Preparation Example 1 was carried out, except that each of FP-1R, FP-2B, FP-2R, FP-3B, and FP-3R was used in place of FP-1B. Thus, stencil inks I-1R, I-2B, I-2R, I-3B, and I-3R respectively corresponding to those suspensions were obtained. Examination of the thus-obtained stencil inks with an optical microscope at a magnification of 1,000 diameters revealed that the fine particles in each ink had not aggregated and were uniformly dispersed in the ink.

INK PREPARATION EXAMPLES 7 TO 12

The same procedure as in Ink Preparation Example 1 was carried out, except that castor oil (solubility parameter, 9.9) was used in place of alkyd resin AL-1, and that each of FP-1B, FP-1R, FP-2B, FP-2R, FP-3B, and FP-3R was used. Thus, stencil inks I-5B, I-5R, I-6B, I-6R, I-7B, and I-7R respectively corresponding to those suspensions were obtained. Examination of the thus-obtained stencil inks with an optical microscope at a magnification of 1,000 diameters revealed that the fine particles in each ink had not aggregated and were uniformly dispersed in the ink.

INK PREPARATION EXAMPLE 13

Into a 1-liter agihomomixer having a high-speed shearing homomixer at the center and a low-speed paddle mixer disposed therearound (manufactured by Tokushu Kika Kogyo Co., Ltd., Japan) were introduced 139 parts of alkyd resin AL-1, 99 parts of solvent No. 4, and 20 parts of Hexaglyn. The contents were sufficiently kneaded.

Subsequently, 370 parts of a suspension of fine blue particles (FP-1B) which contained 3 parts of magnesium sulfate and 69 parts of ion-exchanged water were added dropwise to the kneaded mixture over a period of about 2 hours and emulsified to obtain a W/O emulsion as a stencil ink. Examination of the thus-obtained stencil ink with an optical microscope at a magnification of 1,000 diameters revealed that the fine particles had not aggregated and were uniformly dispersed in the ink. This ink is referred to as I-1B'.

INK PREPARATION EXAMPLE 14

The same procedure as in Ink Preparation Example 13 was carried out, except that FP-1R was used in place of FP-1B. Thus, stencil ink I-1R' was obtained. Examination of the thus-obtained stencil ink with an optical microscope at a magnification of 1,000 diameters revealed that the fine particles had not aggregated and were uniformly dispersed in the ink.

COMPARATIVE INK PREPARATION EXAMPLES 1 AND 2

Inks were prepared in the same manner as in Ink Preparation Example 1, except that each of FP-4B and FP-4R was used in place of FP-1B. However, aggregates recognizable with the naked eye generated in each mixture during the step of thermal water vaporization for obtaining an alkyd resin dispersion of blue or red fine particles. The dispersions finally obtained were in a gel state. Thus, a stencil ink of the desired quality could not be obtained.

COMPARATIVE INK PREPARATION EXAMPLES 3 AND 4

Inks were prepared in the same manner as in Ink Preparation Example 1, except that castor oil was used in place of alkyd resin AL-1, and that each of FP-4B and FP-4R was used in place of FP-1B. However, as in Comparative Ink Preparation Examples 1 and 2, aggregates recognizable with the naked eye generated in each mixture during the step of thermal water vaporization for obtaining an alkyd resin dispersion of blue or red fine particles. The dispersions finally obtained were in a gel state. Thus, a stencil ink of the desired quality could not be obtained.

COMPARATIVE INK PREPARATION EXAMPLES 5 AND 6

Inks were prepared in the same manner as in Ink Preparation Example 7, except that each of FP-4B and FP-4R was used in place of FP-1B. However, aggregates recognizable with the naked eye generated in each mixture during the step of the dropwise addition of the suspension of fine particles. The dispersions finally obtained were in a gel state. Thus, a stencil ink of the desired quality could not be obtained.

COMPARATIVE INK PREPARATION EXAMPLE 7

A mixture of 620 parts of alkyd resin AL-1, 300 parts of solvent No. 4, and 80 parts of blue pigment "Fastgen Blue FGF" (a copper phthalocyanine blue pigment manufactured by Dainippon Ink & Chemicals, Inc.) was kneaded with a three-roll mill. Into a 1-liter beaker was introduced 100 parts of the thus-obtained alkyd resin dispersion of the blue pigment.

To this dispersion was added 6 parts of Hexaglin 5-O (manufactured by Nikko Chemicals Co., Ltd.; polyglycerol/fatty acid ester; HLB=4). The mixture was sufficiently kneaded. Subsequently, 105 parts of ion-exchanged water containing 1 part of magnesium sulfate was added dropwise to the kneaded mixture with stirring over a period of about 1 hour to obtain a W/O emulsion as a stencil ink. This ink is referred to as I-4B.

COMPARATIVE INK PREPARATION EXAMPLE 8

A stencil ink was prepared in the same manner as in Comparative Ink Preparation Example 7, except that a red pigment was used in place of the blue pigment. The ink obtained is referred to as I-4R.

COMPARATIVE INK PREPARATION EXAMPLES 9 AND 10

A blue stencil ink and a red stencil ink were prepared respectively in the same manner as in Comparative Ink Preparation Examples 7 and 8, except that castor oil was used in place of alkyd resin AL-1. The blue and red inks obtained are referred to as I-8B and I-8R, respectively.

STENCIL INK EVALUATION EXAMPLE

The stencil inks obtained in Ink Preparation Examples 1 to 14 and Comparative Ink Preparation Examples 7 to 10 were evaluated by the following methods. The evaluation results obtained are shown in Tables 2 and 3. The test methods used are as follows.

[Viscosity Measurement]
The viscosity of each ink was measured at 30° C. with a stress-controlling rheometer.
[Storage Stability]
Each stencil ink was placed in a 300-ml sample can, which was then allowed to stand in a 50° C. thermostatic chamber. The state of the ink was examined at an interval of 1 week over a period of 10 weeks.
[Printing Test]
Using stencil printing machine Risograph RA203 (a digital printing machine manufactured by Riso Kagaku Corporation, Japan), printing was conducted in an ordinary way. The images obtained were examined with the following rating.

A: Good printed matter was obtained.

C: Printed matter with poor color formation was obtained.

D: No image was obtained during printing.

TABLE 2

Results of evaluation of stencil inks

| Stencil ink | Viscosity (Pa·s) | Storage stability (50° C.) | Printing test |
|---|---|---|---|
| I-1B | 3.88 | no change (10 weeks after) | A |
| I-2B | 3.89 | " | " |
| I-3B | 3.85 | " | " |
| I-1B' | 3.90 | " | " |
| I-1R | 3.86 | " | " |
| I-2R | 3.88 | " | " |
| I-3R | 3.90 | " | " |
| I-1R' | 3.88 | " | " |
| I-4B | 2.21 | color changed just after emulsification | C |
| I-4R | 1.68 | water separation occurred at 5 weeks after | D |

TABLE 3

Results of evaluation of stencil inks

| Stencil ink | Viscosity (Pa·s) | Storage stability (50° C.) | Printing test |
|---|---|---|---|
| I-5B | 3.15 | no change (10 weeks after) | A |
| I-6B | 3.14 | " | " |
| I-7B | 3.17 | " | " |
| I-5R | 3.15 | " | " |
| I-6R | 3.15 | " | " |
| I-7R | 3.14 | " | " |
| I-8B | 1.87 | color changed just after emulsification | C |
| I-8R | 1.42 | water separation occurred at 3 weeks after | D |

The above results show the following. The stencil inks obtained using the finely particulate polymers according to the present invention not only were usable in an ordinary printing operation, but also had the same viscosity even though pigments of different colors had been incorporated using the same formulation. Furthermore, even though the colorants incorporated were pigments which in their untreated state have been regarded as unusable due to their adverse influence on ink storage stability, the stencil inks obtained using the finely particulate polymers according to the present invention showed excellent storage stability because those pigments were encapsulated in the individual fine polymer particles.

The present invention can provide a finely particulate polymer for use in stencil inks which is highly advantageous in that stencil inks having an appropriate viscosity can be easily obtained with the particulate polymer using the same formulation even when the inks contain different colorants, and that with the particulate polymer, a colorant which has been unusable due to its adverse influence on the storage stability of stencil inks can be used to produce a stencil ink having excellent storage stability by encapsulating the colorant in the individual polymer particles.

While the invention has been described in detail and with reference to specific embodiments thereof, it will be apparent to one skilled in the art that various changes and modifications can be made therein without departing from the spirit and scope thereof.

What is claimed is:

1. A finely particulate polymer for use in stencil ink, said polymer being uniformly dispersible into a binder polymer having a solubility parameter of 11.0 or lower, having an average particle diameter of from 0.1 to 10 $\mu$m and a maximum particle diameter of 50 $\mu$m or smaller, and containing a colorant encapsulated therein, wherein the finely particulate polymer is constituted of a crosslinked polymer component.

2. The finely particulate polymer for use in stencil ink as claimed in claim 1, wherein said finely particulate polymer is constituted of a polymer component having a solubility parameter of 11.0 or lower.

3. The finely particulate polymer for use in stencil ink as claimed in claim 1, wherein said finely particulate polymer has a particle size distribution which, when applied to the Weibull probability distribution, has a value of m of 1.3 or larger.

4. The finely particulate polymer for use in stencil ink as claimed in claim 2, wherein said finely particulate polymer has a particulate size distribution which, when applied to the Weibull probability distribution, has a value of m of 1.3 or larger.

5. The finely particulate polymer for use in stencil ink as claimed in claim 1, wherein said finely particulate polymer is constituted of a polymer component comprising a polyurethane resin or a polyurethane-polyurea resin.

6. The finely particulate polymer for use in stencil ink as claimed in claim 1, wherein said finely particulate polymer is constituted of a polymer component comprising a polyurethane resin or a polyurethane resin or a polyurethane-polyurea resin.

7. A stencil ink comprising a binder polymer having a solubility parameter of 11.0 or lower, said binder polymer containing a finely particulate polymer dispersed therein which has an average particle diameter of from 0.1 to 10 $\mu$m and a maximum particle diameter of 50 $\mu$m or smaller and contains a colorant encapsulated therein, wherein the finely particulate polymer is constituted of a crosslinked polymer component.

8. A stencil ink emulsion comprising an oil phase and an aqueous phase, said oil phase comprising a binder polymer having a solubility parameter of 11.0 or lower, said binder polymer containing a finely particulate polymer dispersed therein which has an average particle diameter of from 0.1 to 10 $\mu$m and a maximum particle diameter of 50 $\mu$m or smaller and contains a colorant encapsulated therein, wherein the finely particulate polymer is constituted of a crosslinked polymer component.

9. The stencil ink as claimed in claim 7, wherein the polymer component constituting said finely particulate polymer has a solubility parameter of 11.0 or lower.

10. The stencil ink as claimed in claim 8, wherein the polymer component constituting said finely particulate polymer has a solubility parameter of 11.0 or lower.

* * * * *